(12) United States Patent  
Sun et al.

(10) Patent No.: US 8,630,945 B1  
(45) Date of Patent: Jan. 14, 2014

(54) METHOD FOR TRANSACTION PROCESSING IN A CAPTURE AND DEPOSIT

(71) Applicant: JPMorgan Chase Bank, N.A., New York, NY (US)

(72) Inventors: Albert Sun, Brooklyn, NY (US); Howard Shaw, Old Bethpage, NY (US); Matt Vanhouten, Rochester, NY (US); Richard Re, Westfield, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/800,079

(22) Filed: Mar. 13, 2013

Related U.S. Application Data

(62) Division of application No. 11/400,171, filed on Apr. 10, 2006, now abandoned.

(60) Provisional application No. 60/743,157, filed on Jan. 20, 2006.

(51) Int. Cl.  
*G06Q 40/00* (2012.01)

(52) U.S. Cl.  
USPC .......................................................... 705/39

(58) Field of Classification Search  
USPC .................................................... 705/40, 45  
See application file for complete search history.

(56) References Cited

U.S. PATENT DOCUMENTS 7,349,884 B1 * 3/2008 Odom et al. ..................... 705/40  
2006/0106717 A1 * 5/2006 Randle et al. ................... 705/45

\* cited by examiner

*Primary Examiner* — Samica L Norman  
(74) *Attorney, Agent, or Firm* — Hunton & Williams LLP

(57) ABSTRACT

A system and method for integrating transaction processing is disclosed. The different processes are integrated by use of a controlling processing engine which contains instructions on how the processes should be treated. The system and method provides an end to end integrated system for processing payments and reporting the transaction results in real time. The system and method allows customers to have access to the transaction data in real time and return any excepted payments in real time.

15 Claims, 19 Drawing Sheets

METHOD FOR TRANSACTION PROCESSING IN A CAPTURE AND DEPOSIT

CROSS REFERENCE TO RELATED APPLICATIONS

The present invention claims priority to U.S. Provisional Application No. 60/743,157 filed Jan. 20, 2006, the contents of which are incorporated herein by reference in their entirety.

This application is a Divisional of U.S. patent application Ser. No. 11/400,171, filed Apr. 10, 2006, the contents of which are incorporated herein by reference in their entirety.

FIELD OF THE DISCLOSURE

The present disclosure relates generally to integrating processes related to electronic payment, and is particularly directed to data processing related to data capture and deposit management systems.

BACKGROUND OF THE DISCLOSURE

The need to make and efficiently track payments is a major concern for business and individuals alike. Generally, there are separate lines of processing for each payment type and particular payment locations may only accept or prefer certain payment types but not others. For instance, a small merchant may not accept a credit card because he does not want to pay the high cost of the credit card payment transaction, just as a large entity may prefer not to accept checks as payment due to the amount of manual labor required to process the payment and the systemic risks. As technology advances, both payees and payors will want faster, more efficient, more secure, and more transparent payment processes across all payment types. Convergence of payment types and changes in security settlement regulations will result in a corresponding convergence in delivery and payment channels. This evolution will require financial institutions to: meet changing regulations; use the most convenient payment instruments; improve productivity; reduce operational, credit, and systemic risks; reduce costs and capital investments; and improve funds availability.

Present payment solutions include Electronic Check Present (ECP), Image Cash Letter Exchange Image Replacement Document (IRD), Automated Clearing House (ACH), and ATM Enhanced Message Structure (EMS), and credit cards. Based on processing cost, funds availability, and credit and systemic risks, each has its respective strengths and weaknesses. Each of the above solutions is generally fixed to a single type of payment and does not integrate processing across different payment types. Also, many of the above solutions are cost prohibitive to all but the largest institutions. In all solutions but ACH, the cost of presenting an electronic check is projected to be more expensive than presenting a traditional paper check. However, some merchants do not like to use ACH as payment mechanism due to the potential payment risks. For example, under ACH a return can occur 45 days after the good has been provided to the consumer.

In view of the disadvantages of the present state of the art, it would be desirable to develop an integrated method for end-to-end real-time capture, processing, management and clearing, which increases availability, lower costs, reduce risks, and thus overcomes the above-described inadequacies and shortcomings.

SUMMARY OF THE DISCLOSURE

The present subject matter relates to integrating transaction processing. The different payment processes are integrated by use of a controlling processing engine and processing data related to transactions.

In one embodiment, the system may comprise:
an integrated distributed capture module for capturing data at payment acceptance locations;
a central processing module, wherein the central processing module accepts multiple payment types;
an electronic quality control module;
an electronic payment type determination module;
a payment processing instruction at the central processing module, wherein the processing instruction includes customer defined rules, processor defined rules, and regulatory defined rules,
    wherein the payments are processed based on the payment processing instruction;
a clearing module,
    wherein the clearing module manages a transaction based on the payment;
a transaction management module for managing transmissions and reports regarding the transaction in real time;
an inquiry management module for managing inquiries regarding the transaction in real time.

In another embodiment, the method may comprise:
processing payments on a central processing engine that accepts a plurality of payment types, wherein the central processing engine processes the payments based on processing instructions, wherein the processing instructions include at least a customer defined instruction, a processor defined instruction, and a regulatory defined instruction;
capturing data related to a payment at a payment accepting location;
transmitting captured data to the central processing engine;
reviewing the captured data for quality of capture;
recognizing the type of payment from the captured data;
reporting transaction data in real time; and
providing access to the real time transaction data.

In another embodiment the integrated system may comprise capturing data at payment acceptance locations, such as branches, payment centers, cash register, cashiers, payment/receivable processing centers, etc.; a processor to review the quality of the captured data; a payment neutral processing engine that processes exceptions, manages transactions, including reporting to and answering inquiries from customers, creating files; routing images, data and electronic transactions through appropriate payment channels based on customers' and financial institutions' clearing profiles.

Some of the features in the present disclosure include: (1) the ability to convert one type of payment, such as a physical check, into another type of payment, such as a purely electronic transaction; (2) the ability to report or access real-time transaction data; (3) the web-enabled access; (4) the ability to enable payors, payees, processors, their agents or other interested parties to choose appropriate payment channels to clear payments; (5) the ability to detect high risk transactions, which reduces fraud and prevents double posting; and (6) the ability to tailor the system design for changing needs.

BRIEF DESCRIPTION OF THE DRAWINGS

In order to facilitate a fuller understanding of the present disclosure, reference is now made to the accompanying drawings. These drawings should not be construed as limiting the present disclosure, but are intended to be exemplary only.

DETAILED DESCRIPTION

Figure 1A:
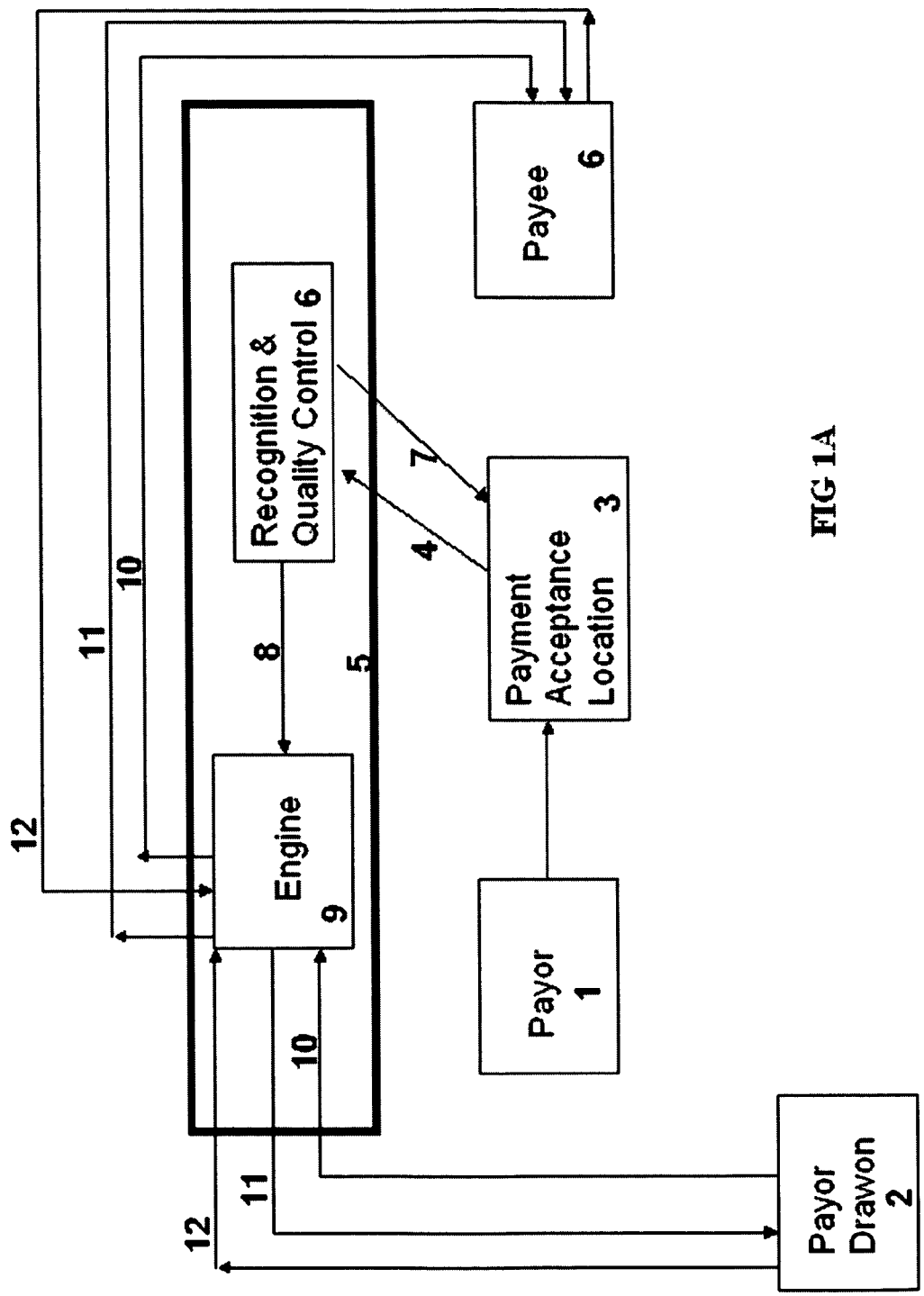
FIG. 1A is a schematic block diagram of an integrated system in accordance with one embodiment of the present disclosure.

With reference to FIG. 1A, a payor 100 would make a payment at a payment acceptance location 3 to the payee 6. The payment acceptance location 3 may be, for example, a branch of a financial institution, a payment center, a back office, a payment processing center, an ATM machine, a cash register, a cashier, point-of sale (POS) locations, central processing sites etc. The payor 1 will present a payment to the payment acceptance location 3. The payment will have a payment type and a payor drawon 2, which is an account and/or institution where the funds will come from. For example, if the payment type is a check, the payor drawon will be the bank and account the check is issued from. If the payment type is a credit card, the payor drawon can be the credit card company and account the card is issued from. The payor drawon can be, for example, a bank, a mutual fund, a credit card company, or any other account where funds can be drawn from. These parties need not be distinct entities. For example, it is possible that the payee 6 and payor drawon 2 are the same entity. Payment types can include, but are not limited to, paper checks, electronic checks, ACH, debit cards, credit cards, and stored value cards. The payor does not need to bring the payment in person, but those of ordinary skill in the art will understand that the invention also applies to electronic payments, payments mailed in or sent in to a location, or any other conventional payment arrangements.

The payment acceptance location 3 will capture data related to the payment. For instance, if the payment type is a check, the image of the check can be digitally captured. In another embodiment, the payment type can be a debit or credit card and the data capture can include data obtained from the magnetic stripe or, in the event the debit or credit card is not present, can digitally image a coupon containing the card account information. In other embodiments, other details can be captured on the coupon, such as billing information.

Once the data is captured, the data is transferred at 4 to a processor or group of processors 6 that will review the image for quality and completeness and determine the payment type from the captured data. Payments may be rejected for several reasons, including, but not limited to fraud (e.g., (invalid signature, invalid account), payment risks (e.g., non-sufficient funds, stop checks), unacceptable payment based on client instructions, unacceptably poor image quality, checks do not meet regulatory requirements (post date, stale date, not endorsed, etc.). In the event the data capture does not meet the quality standards, the data can be rejected at 7 and the processor may notify the payment acceptance location 3 in real time that the data is unacceptable and may request for the data to be recaptured. The recognition and quality control processor can be located at the payment acceptance location 3, at a third party transmission site, or within the payment processor's system 5.

After recognition and quality control 6, the captured data can then be sent to the processing engine 9. The engine processes the payments, regardless of type, according to a set of processing instructions. The engine can consist of one processor or a multiple processors and systems. The processing instructions may include rules such as what order the payment types should be processed, whether processing should take place in real time or in batch, the type of reporting to be sent out, and whether incoming payment types should be converted to another payment type for processing. Generally, there are three contributors to the processing instruction. The customer, who may be the payee, the payee's agent or any one who will benefit from the transaction, the payment processor 5, and a regulatory agency, such as the Federal Reserve or NACHA. These parties need not be distinct entities. For example, it is possible that the customer instruction and payment processor instruction are the same. These rules can provide the customer setup and profile management and contain instruction on area such as product usage, deposit positing criteria, availability schedules, deposit/ledger cut-off times, notification criteria, transmission timing, and formats and pricing records, providing clearing recipient set-up and profile management. These rules can help to speed the clearing process, reduce expense, be more efficient, or reflect what ever goal the requesting party needs to be achieved. For example, payee may have a rule that requests all payments be converted into ACH payments because the payor will be credited faster. This would allow any payments to the payee to be processed as ACH, regardless of whether the payment type was a check, debit card or another payment type. However, all the processing instructions must be followed. For example, the regulatory agency may have a rule that prohibits credit card payments from being converted to ACH. That payment will proceed as a credit card transaction unless there is another non-conflicting rule that deals with its processing.

In another embodiment, other parties may contribute to the processing instructions. For, example, the payor drawon 2 may request that all funds drawn from their account happen in real time instead of in batch. A clearinghouse associated with processing the payment may add its own rules.

Moreover, the processing instructions may also include a means for determining a high risk payment. A database or collection of databases with high risk factors can be used to determine if a transaction is high risk. The databases can be internal, external, proprietary or public and risk factors can include low credit scores, previous payee fraud, low account balances, or if the payee has a high return rate. The risk factors can also focus on the data capture such recognizing differences in signatures, improper payment type forms. The amount of risk a payment can have may be set by the rules provided by the relevant parties. If the risk tolerance is exceeded, the processing instructions may require that the payment be denied or noted as an exception. If the payment is too risky, notification may be sent to the payee 6, payor drawon 2 and/or payment accepting location 3 in real time.

After the payment has been processed according to the processing instructions the processing engine 9 may also have a clearing function that processes the transactions 10 related to the payments. For instance, the transaction 10 could consist of debiting and/or crediting the respective accounts. The processing engine 5 can then report information about the transaction to the payee 6, the payor drawon 2, or any other designated party in batch or real-time. The processing instructions may include instructions on what format the reports should take, the content of the reports and who the reports should go to. The reports may include information about the status of the transactions, when credit will be available, when a debit will be taken, provide an alert for an exception, or anything else about the transaction a party wishes to know.

In an embodiment, an interested party, such as the payor 1, the payment acceptance location 3, the payor drawon 2 or the payee 6, or an outside party acting as an agent for an interested party may access the in real time 12, giving the party the ability to inquire about a specific transaction in real-time. For example, this would provide the payee 6 with an increased degree of flexibility. It allows the payee to look proactively for specific information as opposed to just waiting for the report and looking line by line for the desired transaction. This allow the payee to proactively manage its accounts. Real time reporting and party inquiries can be transmitted in a manner known in the art, such as through the Internet, an intranet, email, instant messages, or other transmission means conducive to real time notification or be updated to the client's accounting systems of payment and information, such as receivables, invoice, inventory, banking accounts, brokerage accounts, etc.

The present invention may be used alone or in conjunction with other payment processing solutions such as lockboxes, distributed check capture devices, credit card capture devices, Accounts Receivable and other accounting systems.

Figure 1B:
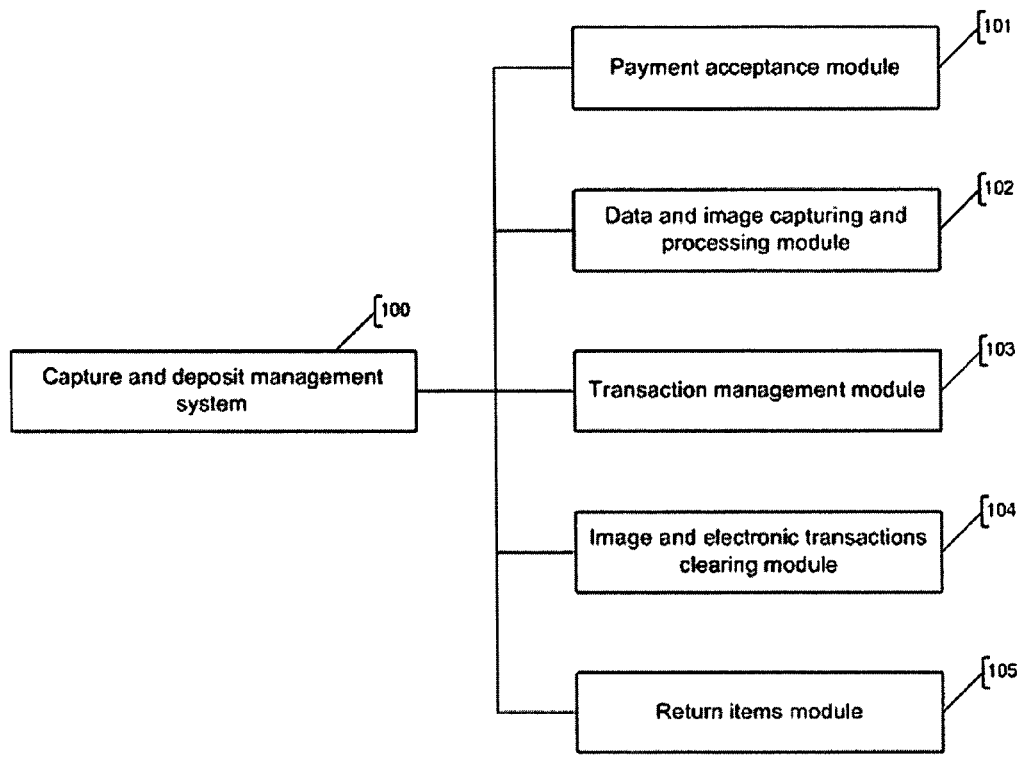
FIG. 1B is a schematic block diagram of the capture and deposit management system in accordance with an embodiment of the present disclosure.

With reference to FIG. 1B, an embodiment is shown for transaction processing in a capture and deposit management system 100. The method may comprise the following functions: capturing data at payment acceptance locations; capturing and processing data at central processing sites including processing exceptions, and proof and control; managing transaction including reporting to and answering inquiries from customers; creating files; routing data and the transactions through appropriate payment channels based on customers' and financial institutions' clearing profiles; and processing return payment data. The capture and deposit management system may comprise five interactive functional modules: (1) a data capture module 101 that captures data such as check images at payment acceptance location 3; (2) a central data capturing and processing module 102 for data entry, image capturing and/or processing, exception processing, and proof and control; (3) a transaction management module 103 for reporting and inquiry, file creation, and transmission management; (4) an data and transaction clearing module 104 that routes both data and transactions through appropriate payment channels based on customers' and financial institutions' clearing profiles; and (5) a return payment module 105 that processes the return payment data, and interfaces with both the data and transaction clearing module and the transaction management module.

Figure 2A:
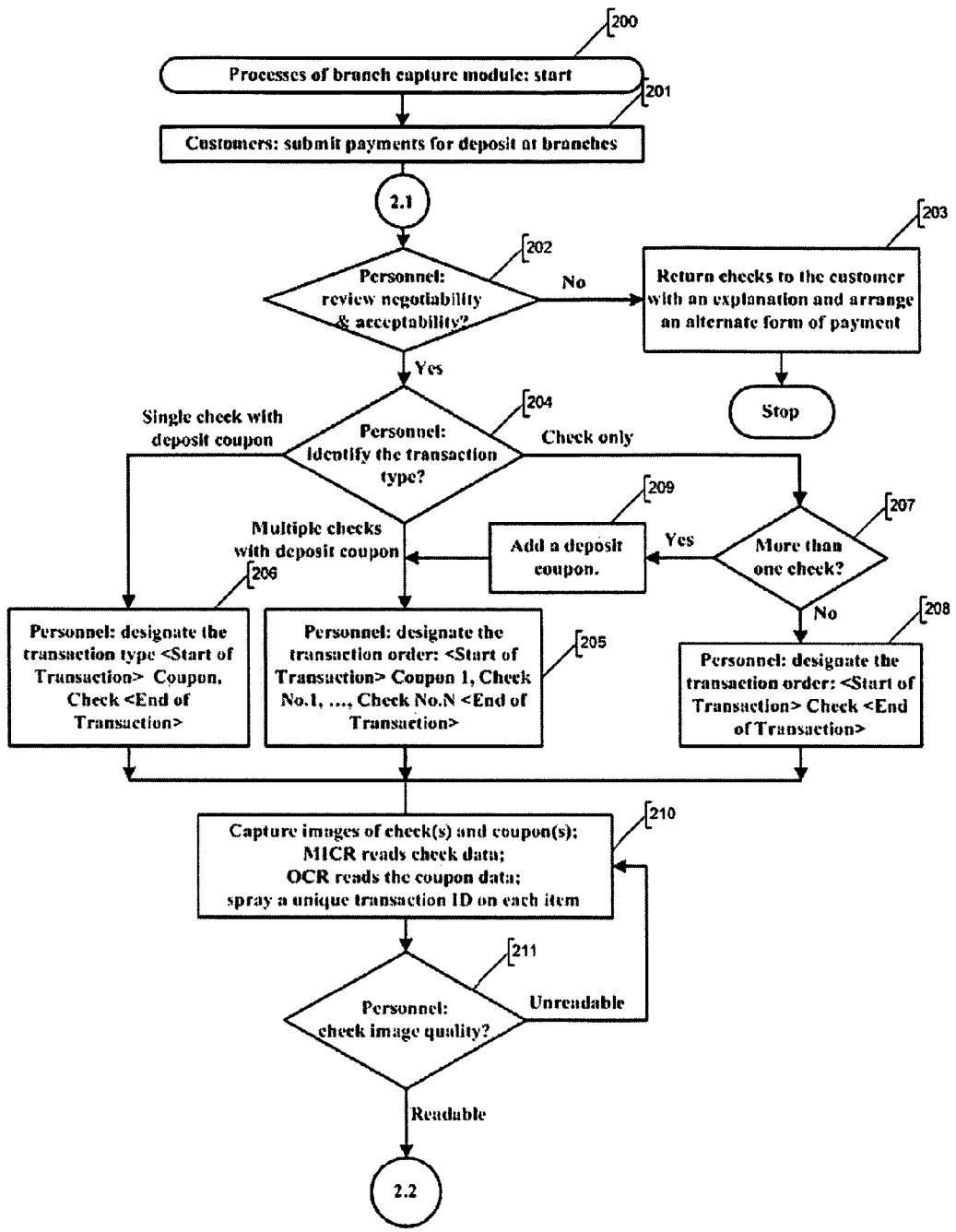
FIGS. 2A-2B are flowcharts depicting the steps carried out by the branch capture module in accordance with an embodiment of the present disclosure.

FIG. 2A depicts an embodiment where a customer submits a check for payment at a bank branch 201, Branch personnel review the item(s) for both generally accepted standards of negotiability as well as acceptability 202. If the checks do not meet these criteria, they can be immediately returned to the customer(s) with an explanation, and an alternate payment form may be arranged 203. If the item(s) meets negotiability and acceptability, branch personnel identify the transaction type (single check with coupon, multiple checks with coupons, or check only) 204. The branch personnel must designate the transaction type. For "multiple checks with coupons" transaction type, the transaction order is <Start of Transaction> Coupon 1, Check 1, . . . , Check N<End of Transaction> 205. For "single check with coupon" transaction type, the transaction order is <Start of Transaction> Coupon, Check <End of Transaction> 206. For "check only" transaction type, if there is only one check 207, the transaction order is <Start of Transaction> Check <End of Transaction> 208; if there is more than one check, checks are processed as one transaction, a deposit coupon is added 209, and the transaction is considered a "multiple checks with coupon" transaction type 205. In correct transaction order, images of check(s) and coupon are captured; check's data are read by magnetic ink character recognition technology (MICR); coupon's data are read by optical character recognition technology (OCR); and a unique identification number is sprayed on each item 210. Branch personnel then review the captured images to ensure good quality 211. If the captured images are unreadable, the corresponding checks and coupons need to be rescanned.

Figure 2B:
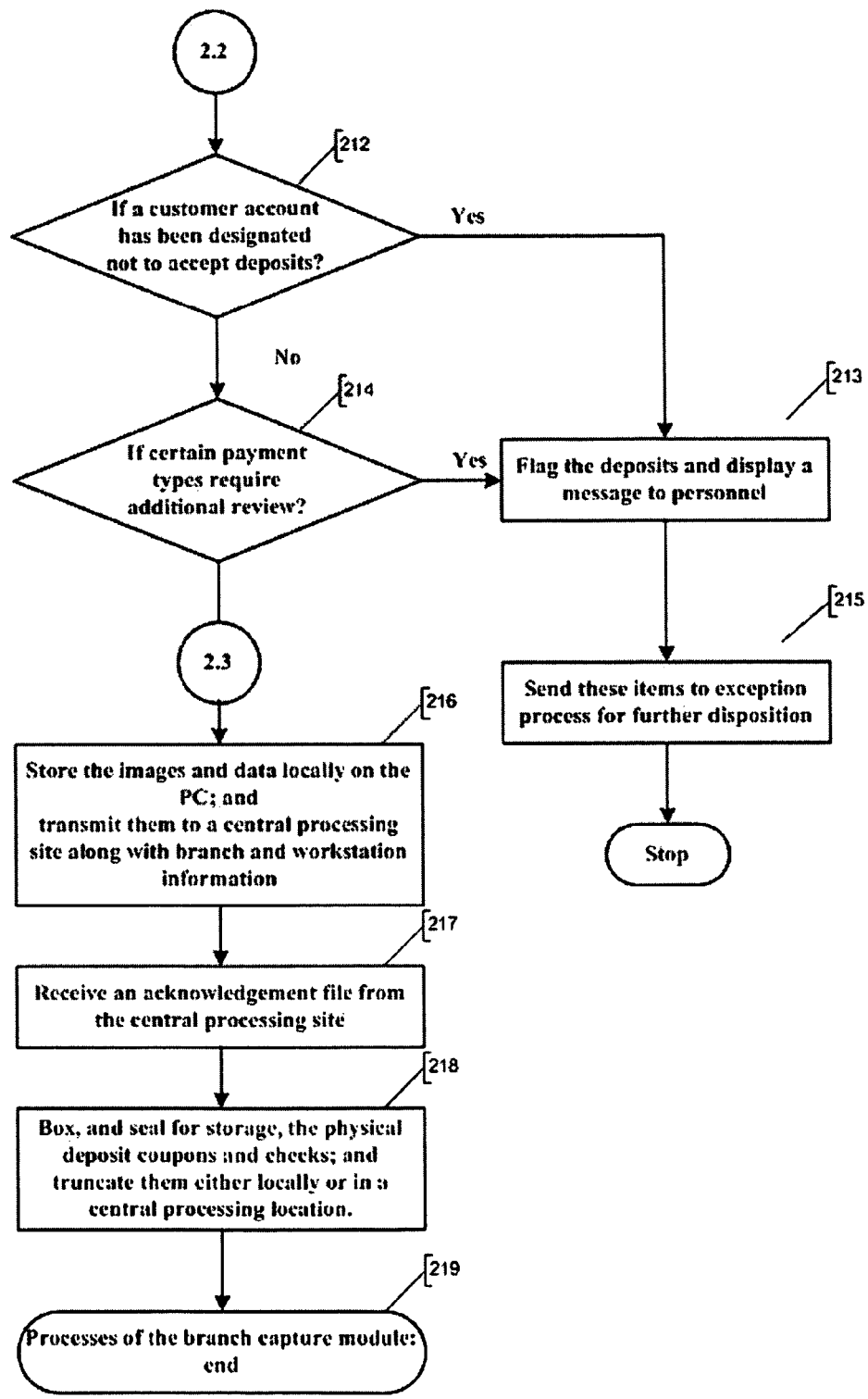

With reference to FIG. 2B, the deposit data are then matched against a stop file 212. If a customer account has been designated not to accept deposits, the matched items will be flagged and a message will be displayed to branch personnel 213. If certain payment types require additional review 214, those items will be flagged and a message will be displayed to the branch personnel. The branch personnel will send these items to an exception process for further disposition 215. The captured images and data are stored locally in a processing category and transmitted to a central processing site along with branch and workstation information 216. The transmitted images and data are secured, authenticated and non-repudiated. The transmission may use XML message format along with web services that can either be transmitted via private network or internet. The central processing site then transmits an acknowledgement (ACK) file for each item received 217. At the end of day the central processing site provides a detailed report on all deposits and checks transmitted. The physical deposit ticket and checks are boxed, sealed for storage, and truncated either locally or in a central processing location per destruction procedures 218. Once the images and data are transmitted to the central processing site, transaction proceeds to the processes of data and image capturing and processing module at a central processing site 300.

The data capture module 101 may comprise: means for reviewing payments for negotiability and acceptability; means for determining transaction type; an image capture device for capturing images and data of the payments, and spraying an identification number on each item of the captured payments; means for matching the captured data against a stop file; and means for transmitting the captured images and data to a central processing site. The image capture device may comprise a scanner which can capture images and read data, a computer, a storage device, and a device for spraying an identification number. The means for matching the captured data against a stop file may be a computer, a special software, and database, which can determine whether a customer account has been designated not to accept payments, and certain payment types require additional review. The means for transmitting the captured images and data to a central processing site may be a web service such as private network or internet.

Figure 3A:
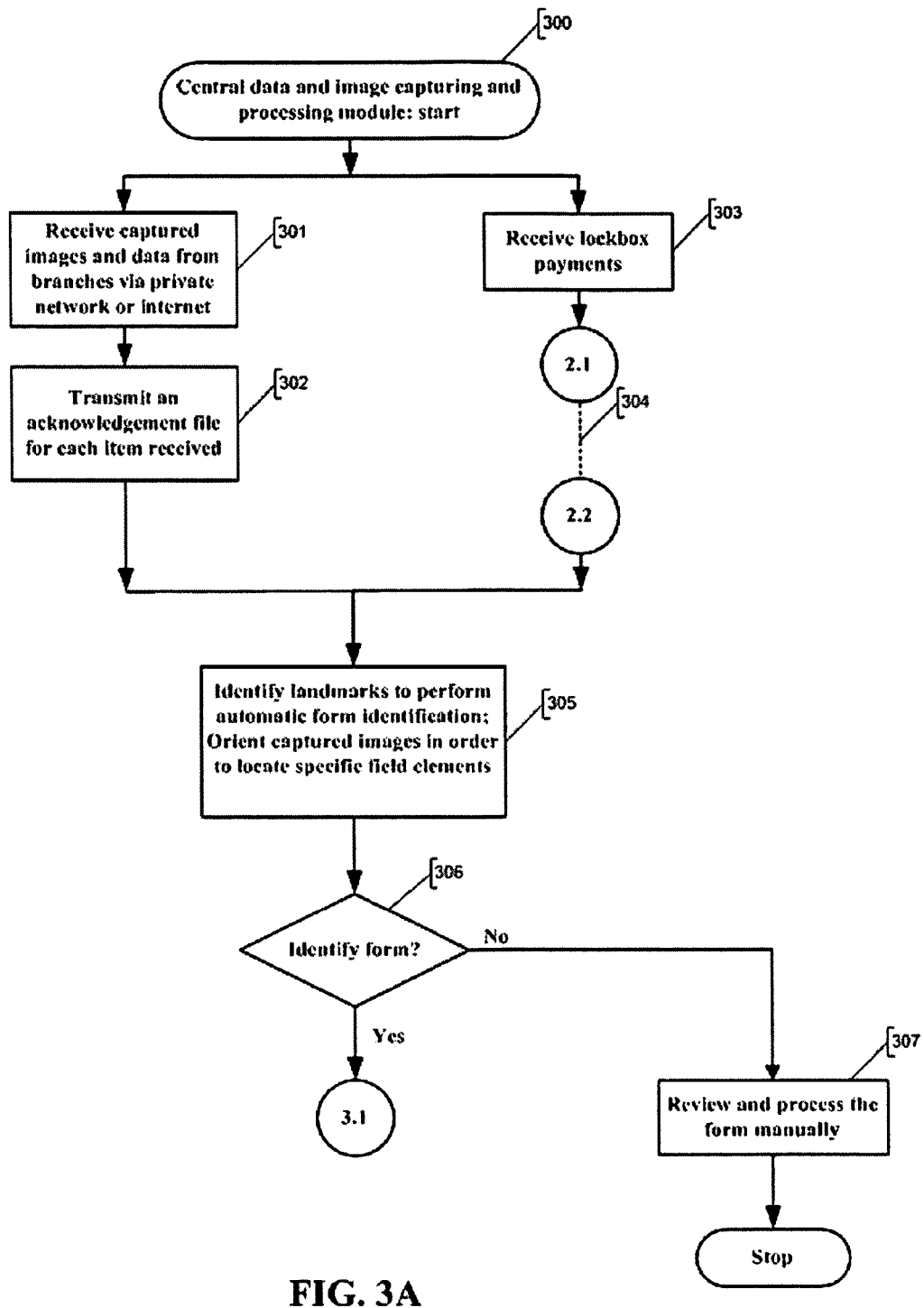
FIGS. 3A-3D are flowcharts depicting the steps carried out by the central image and data capturing and processing module in accordance with an embodiment of the present disclosure.

With reference to FIG. 3A in another embodiment, as a central processing site receives captured images and data from payment acceptance locations 301; it will thereafter transmit an acknowledgement file for each received item 302.

In the meantime, the central processing site also receives lockbox payments 303. All lockbox items are received multiple times per day. The schedule is monitored and modified as necessary to optimize the mail availability. The following procedures are similar to the ones occurring in branches, which are illustrated in 2.1-2.2 of FIG. 2A 304. The lockbox items are sorted into one of the three categories: (1) single payment with deposit coupon, (2) multiple payments with deposit coupon, and (3) payment(s) only. For each of these batch types, site personnel examine payments for general negotiability and acceptability. All lockbox payments are then captured via high-speed scanner. Payments and coupons remain associated throughout the scanning process similar to the procedures occurring in payment centers. From point of capture forward, payment acceptance location and lockbox payments will be processed according to the same basic workflow, as described below. Templates for each payment type that will map to specific fields and business rules are set up ahead of time. Using a high-resolution image of each payment form, the system will be instructed to map particular form elements to one of the identified fields. Landmarks are identified to perform automatic form identification and orient captured images for locating field elements 305. The next step is form identification 306. If the form cannot be identified, it will be manually reviewed and processed 307. Forms are identified based on a combination of visual characteristics and a form ID number. Each form has a "visual fingerprint" for the system to make high-speed determinations. Once the system has narrowed the field, it can look further for a form ID.

Figure 3B:
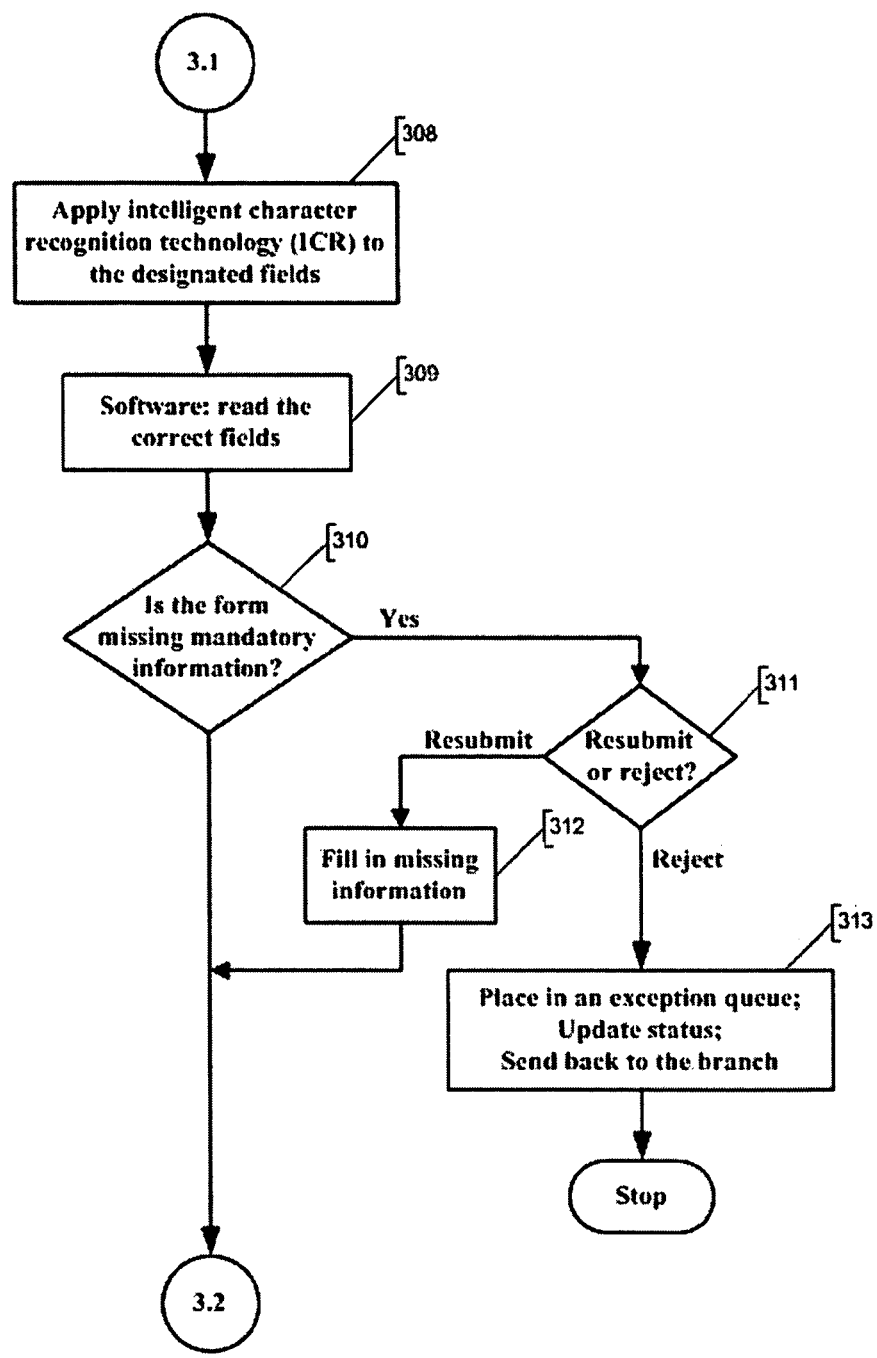

With reference to FIG. 3B, as the form type is identified, intelligent character recognition technology is applied to the designated fields 308. Software will automatically attempt to read the fields 309. Any fields that cannot be read automatically will be displayed for keying. If the form is missing mandatory information 310, site personnel will decide resubmit or reject the transaction 311. If the site personnel decide to resubmit the form, they will fill in missing information 312. The rejected transactions will be placed in an exception queue and sent back to the branch with its status updated 313.

Figure 3C:
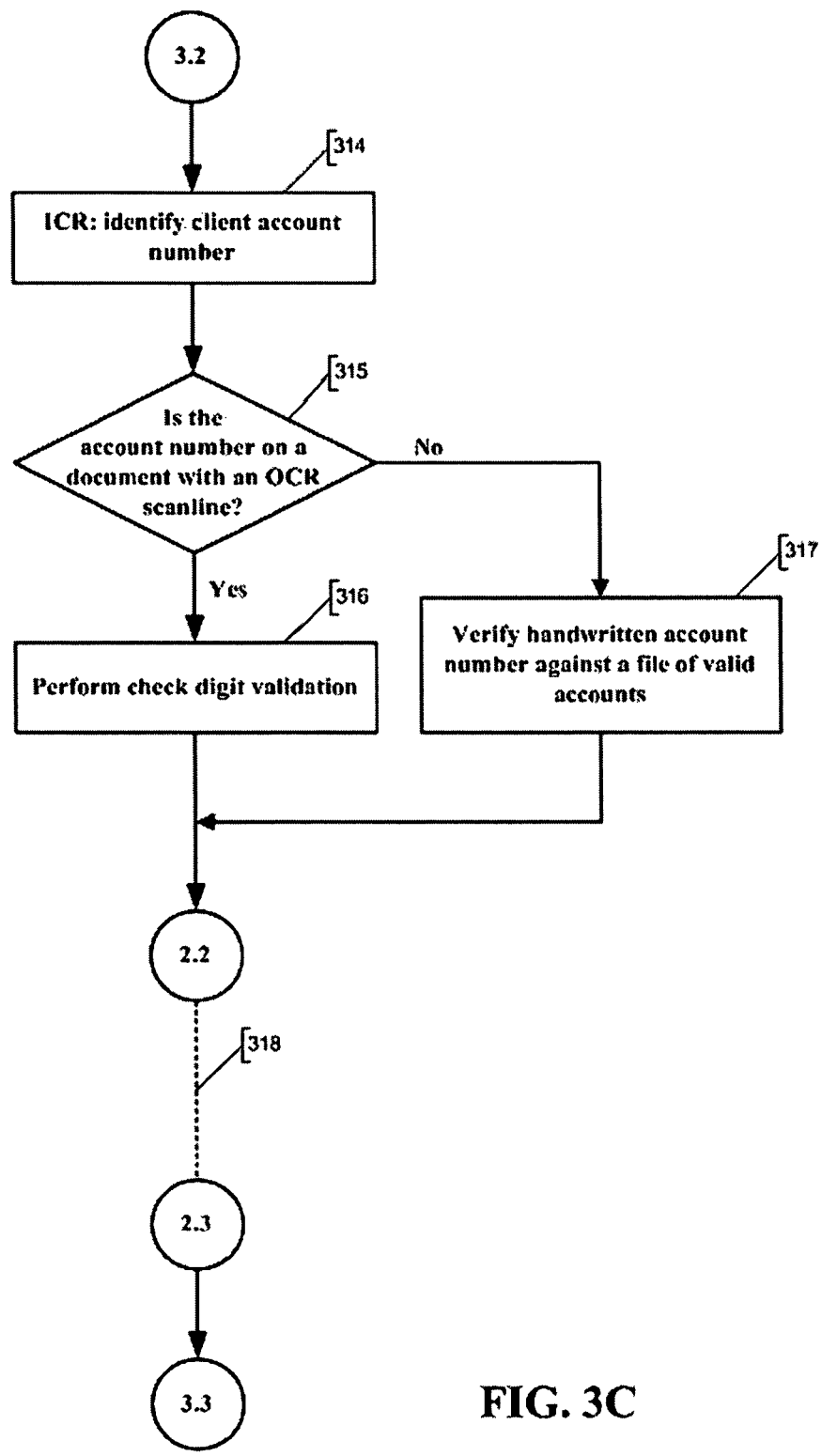

With reference to FIG. 3C, customer account number is then identified and read via the intelligent character recognition technology 314. If the account number is on a document with an optical character recognition (OCR) scan line 315, check digit validation is required 316. If the account number is on a document without an OCR scan line, verification of the handwritten account number is required 317. The following procedures 318 are similar to the ones occurring in branches, which are illustrated in 2.2~2.3 of FIG. 2B. Customer accounts are compared against a stop file to identify accounts which are designated not to accept deposits and possible fraudulent payments. Any identified items will cause the entire deposit to be rejected. A reason code will be added to these rejected items. If the items came from a payment acceptance location, that payment acceptance location will receive notification and the status of the transaction will be updated.

Figure 3D:
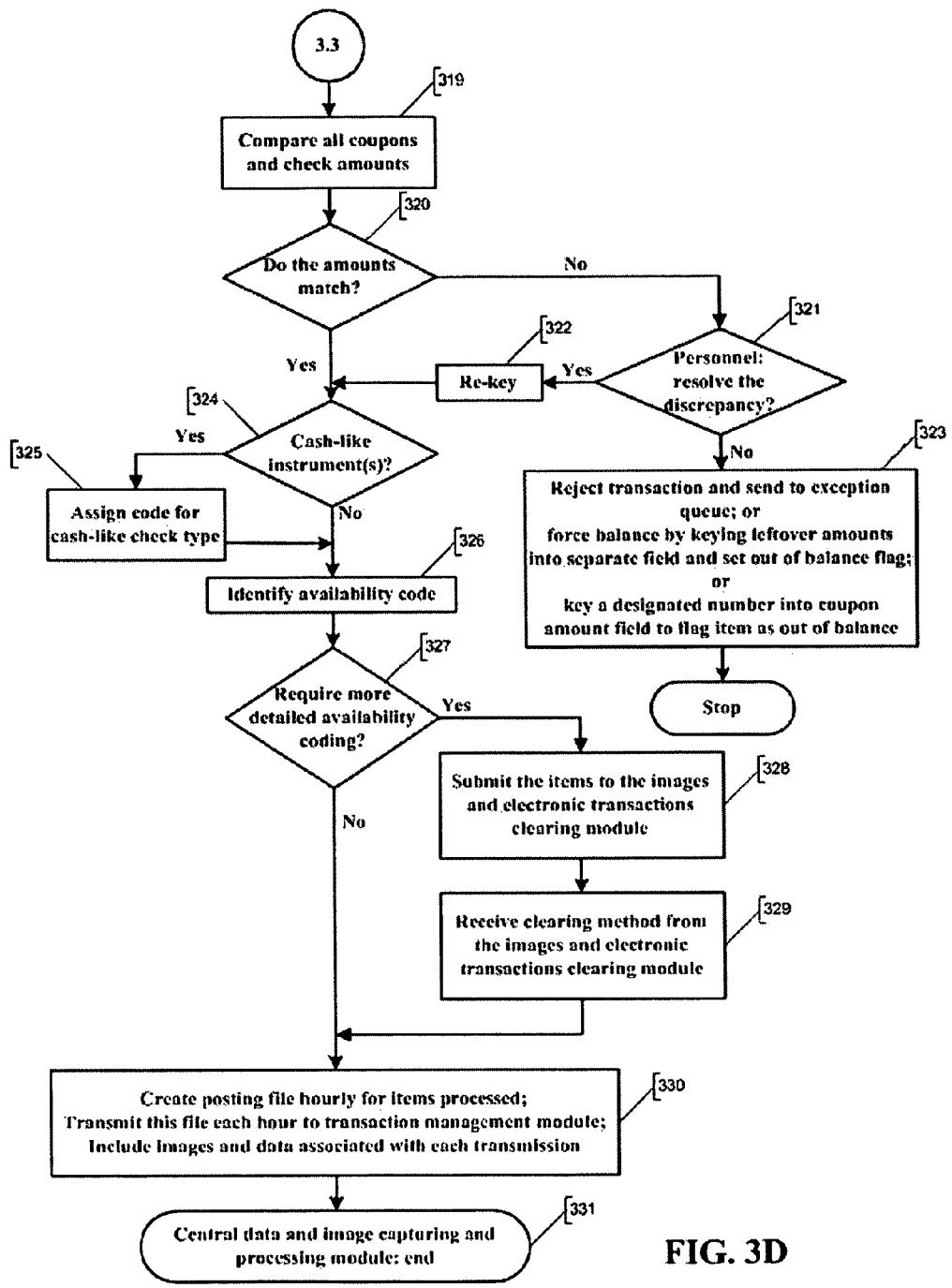

With reference to FIG. 3D, coupon and payment amounts are then compared 319 to determine whether the amounts match 320. If the amounts do not match, they are sent to site personnel for review 321. If the site personnel can resolve the discrepancy, he will re-key 322. If the site personnel cannot resolve the discrepancy, there are several options: reject the transaction and send to exception queue; force balance by keying leftover amounts into separate field and set out of balance flag; key a designated number into coupon amount field to flag item as out of balance 323.

As the amounts get matched, the payments are reviewed to determine whether the payment is cash-like instrument 324. If the payment is a cash-like instrument, a designated code is assigned to each payment 325. Then an availability code will be assigned to each payment based on account number and branch location 326. If the system requires more detailed availability coding 327, the central processing site will submit the items to the images and electronic transactions clearing module 328. Once a clearing method was determined, the image and electronic transactions clearing module will send that information to the central processing site 329.

A posting file is created hourly for the items processed. This file will not be cumulative. Each hour this file is transmitted from the central processing site to the transaction management module. The images and data associated with each transaction will be included in this transmission 330.

The central data capturing and processing module 102 may comprise: means for receiving transmitted captured images and data from payment acceptance locations; means for receiving lockbox payments and determining transaction type; an image capture device for capturing images and data of lockbox payments; means for identifying payment form types; means for processing payment forms; and means for transmitting posting files of processed items together with images and data to the transaction management module. The means for receiving transmitted captured images and data from branches may comprise computer connected, web service, data storage device, and software. An image capture device for capturing images and data of lockbox payments may comprise scanner, computer, data storage device, device for spraying identification number on each item, and software. The means for identifying payment form types may be form identification software. The means for processing payment forms may be software performing the designated functions. The means for transmitting posting files of processed items together with images and data to the transaction management module may comprise computer, software, and web service.

Figure 4A:
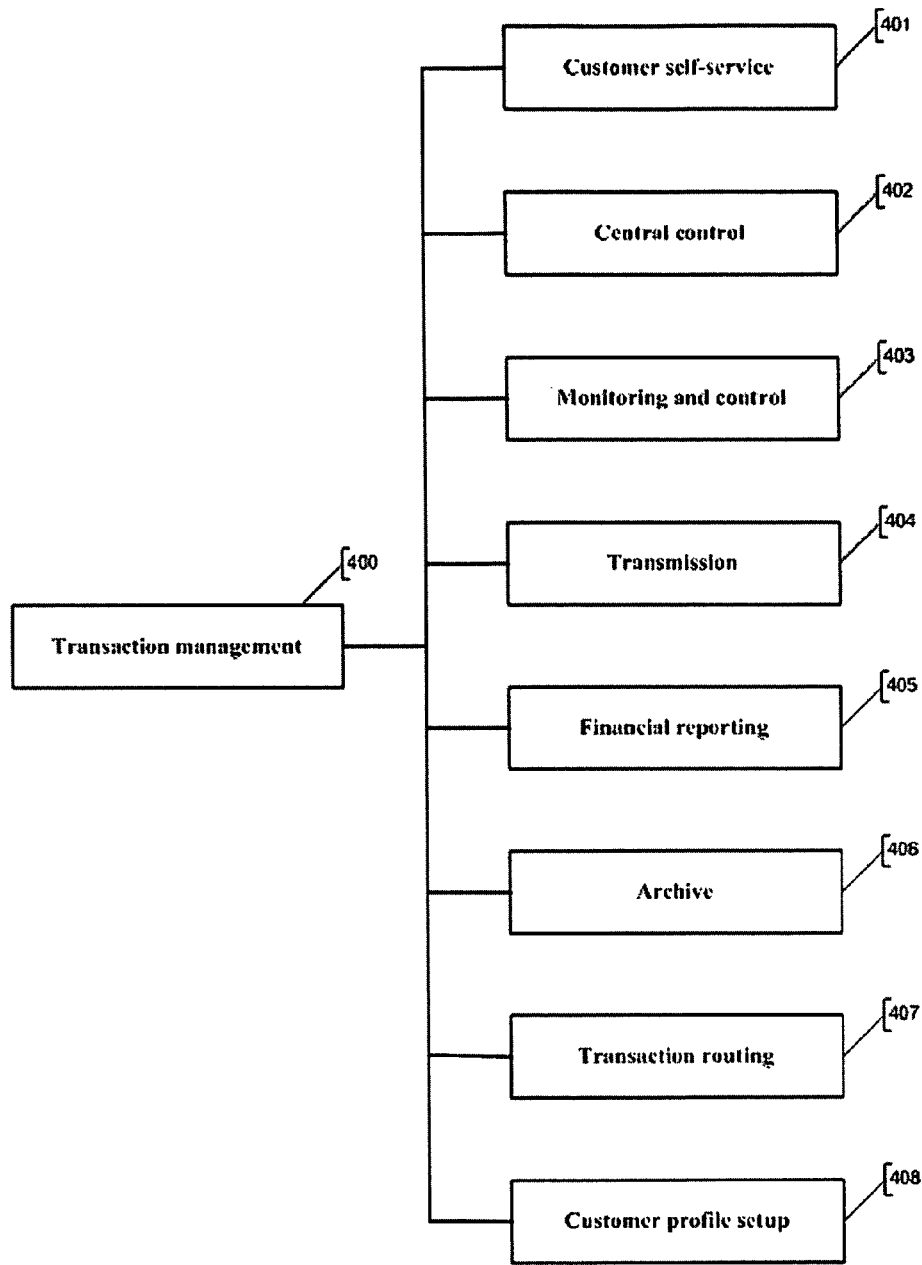
FIGS. 4A-4F are schematic block diagrams of the transaction management module in accordance with an embodiment of the present disclosure.

With reference to FIG. 4A, transaction management 400 comprises: customer self-service 401; central control 402; monitoring and control 403; transmission 404; financial reporting 405; archive 406; transaction routing 407; and customer profile setup 408.

Figure 4B:
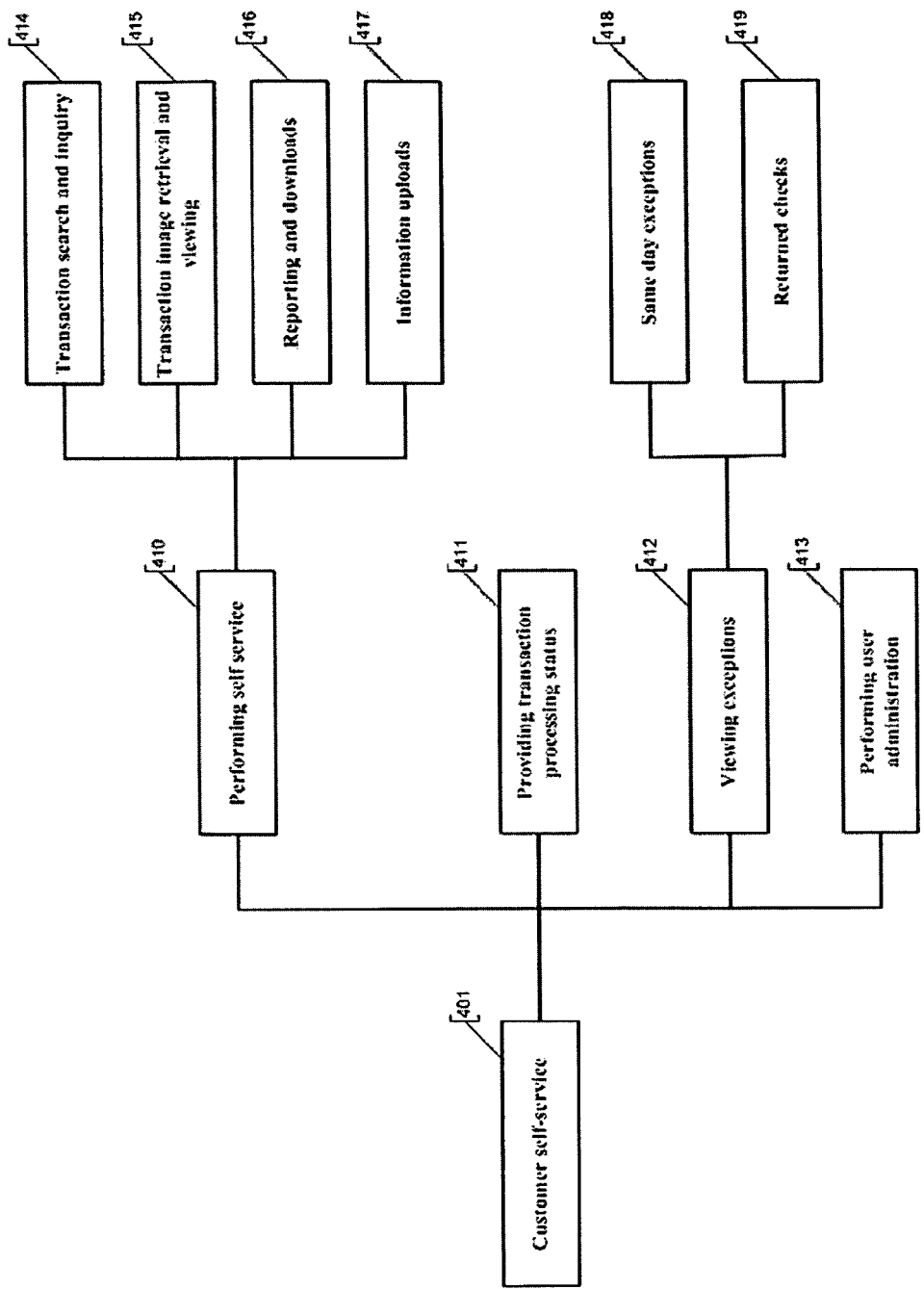

With reference to FIG. 4B, The customer self-service 401 is a real time internet-based web browser application (however, any communication means conducive to real time transmission is acceptable) which can perform self service 410, provide transaction processing status 411, view exceptions 412, and perform user Administration 413. The exception processing 412 comprises same day exceptions 418 and returned payments 419. The self service 410 comprises transaction search and inquiry 414, transaction image retrieval and views 415, reporting and downloads 416, and information uploads 417. The self service 410 allows a customer to inquire about captured, processed or exception transactions. It provides the ability to inquire about batch processing status. It can also deliver alerts on requirements. Personnel can search and view processed transactions, and retrieve the transaction images to service customers. The viewed image could be a remittance coupon, a full page document or a check. The transaction detail and their respective images can be displayed on the same viewing page or just the images themselves. The search function provides any number of ways to find a transaction. Deposit information can be viewed from same day real time up to a designated period of time (say 1 month, 3 months, 1 year). The system can view and download reports and other summary information related to their Lockbox activity. Reports can even combine lockbox activity with associated electronic payment activity. At the end of day, daily transaction reports can be either viewed online, or printed, or downloaded as XML, CVS or HTML file. Files can also be uploaded and sent to designated operations.

Providing transaction processing status function 411 will provide personnel with the status of a transaction in real time. This allows personnel to view all the transactions and their respective processing status. Personnel can see whether a transaction was transmitted successfully to the central processing site. This function will also display the status of processing steps within the transaction management module. Viewing exceptions function 412 will allow personnel to view any exceptions. This facility has two functions. The first is to view the real time same day exceptions. These exceptions could be a check that has a "stop pay" placed on it, or a closed or dormant account, or a bad account number, or had already been posted. They could also be foreign checks, or payments that match stop pay criteria, or payments that do not pass image usability standards and require rescanning, or checks that fail internal processing rules. These exceptions may need to be pulled manually from the work to be reviewed and they would require further disposition. The viewing exceptions function will also allow personnel to view returned checks. Personnel can then contact their customers to inquire whether the returned payments should be re-deposited. A designated security officer can be made as a user administrator 413. This administrator can assign id and roles to both branch and central operation personnel. This application allows only designated personnel to access designated functions.

Figure 4C:
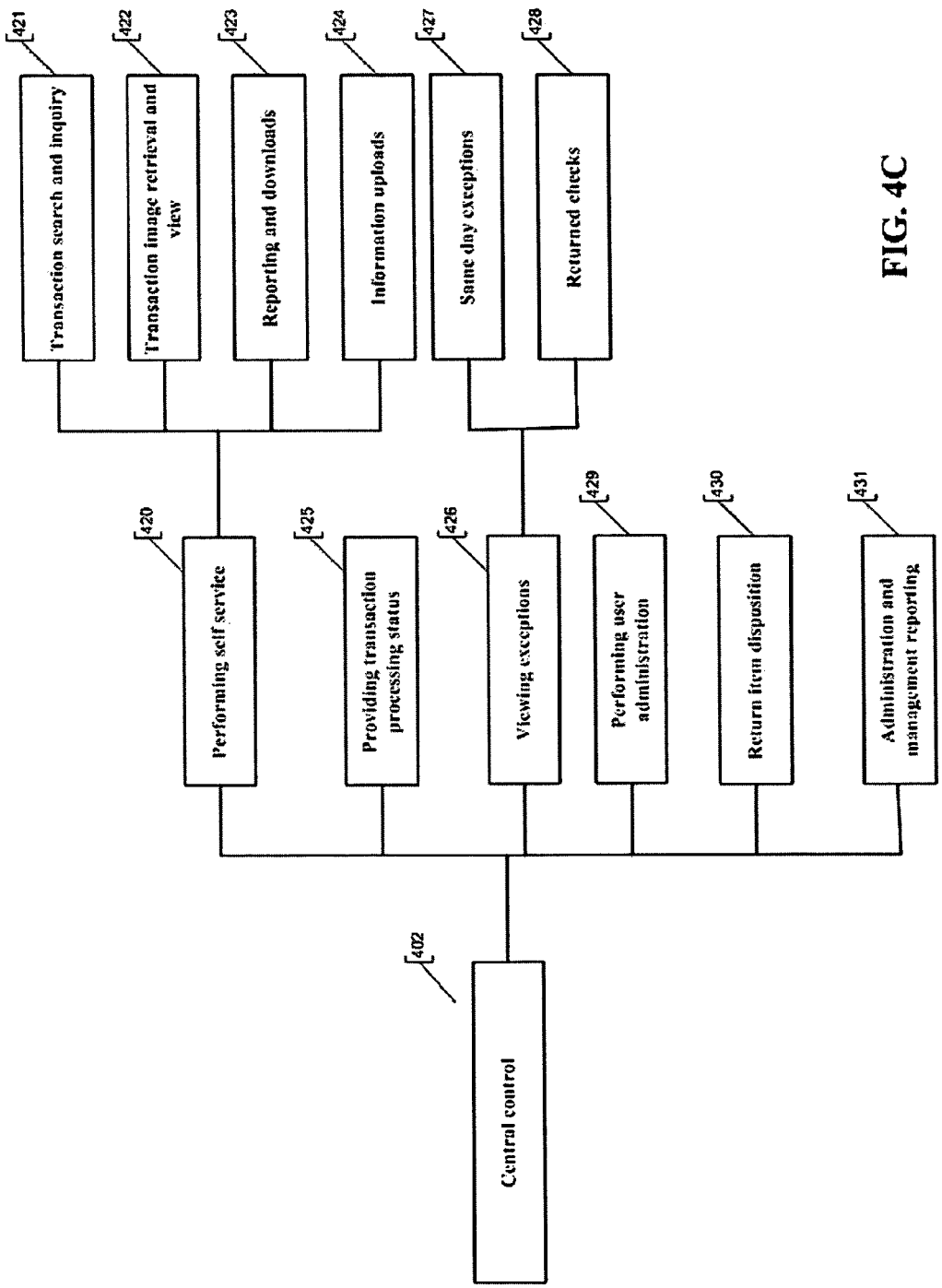

With reference to FIG. 4C, the central control 402 is an intranet web browser application for viewing processed transactions and their status. In addition to performing the same functions 420-429 of the customer self service, it has additional return items disposition function 430 and a more robust system administration and management reporting function 431. The central control can select eligible return items to be re-deposited online either centrally or from a payment acceptance location. The management reporting has a list of operations and financial reports that can be selected for use or customized as required.

Figure 4D:
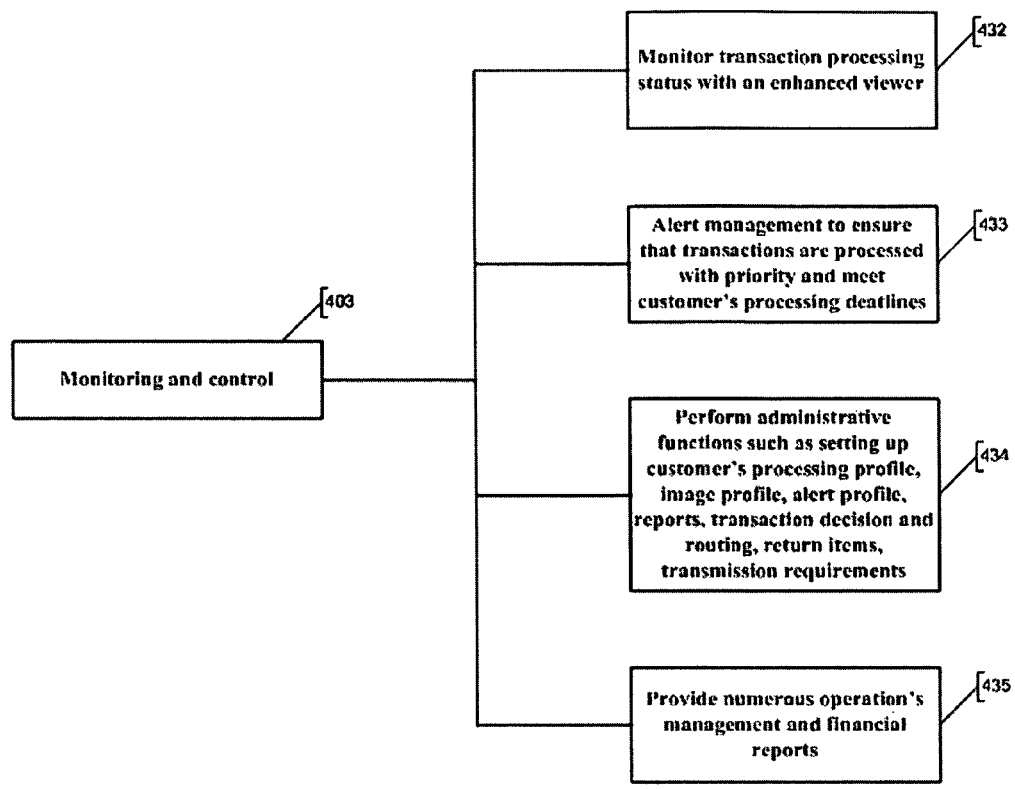

With reference to FIG. 4D, the monitoring and control 403 can monitor transaction processing status with an enhanced viewer 432. It can use this monitoring facility to alert management to ensure that transactions are processed with priority and meet customer's processing deadlines 433. This facility can perform administrative functions such as setting up customer's processing profile, image profile, alert profile, reports, transaction decision and routing, return items, transmission requirements, and other processing requirements that customers may have for their payments 434. This facility also provides numerous management and financial reports to the central processing site 435. These reports will allow the central processing site to monitor the quality of processing, work load balancing, and ensure work processed with priority. These reports will provide financial reporting, availability reporting, and balancing reporting.

The transmission function 404 can be configured to use a number of standard file formats to transmit files on an hourly basis or at any interval. It can also be customized to receive the stop pay file and other special instructions.

The transaction management module provides a number of management reports to perform financial balancing and reconcile details 405. It also provides daily deposits and transaction availability. The function provides a number of management reports on daily processing, exception, return, and other critical processing information by payment acceptance location.

The transaction management module stores both transactions and images in its archive 406. This information is stored for customer service to search and research transactions and retrieve associated images. The archive will track payments clearing methods along with the availability assignment.

Figure 4E:
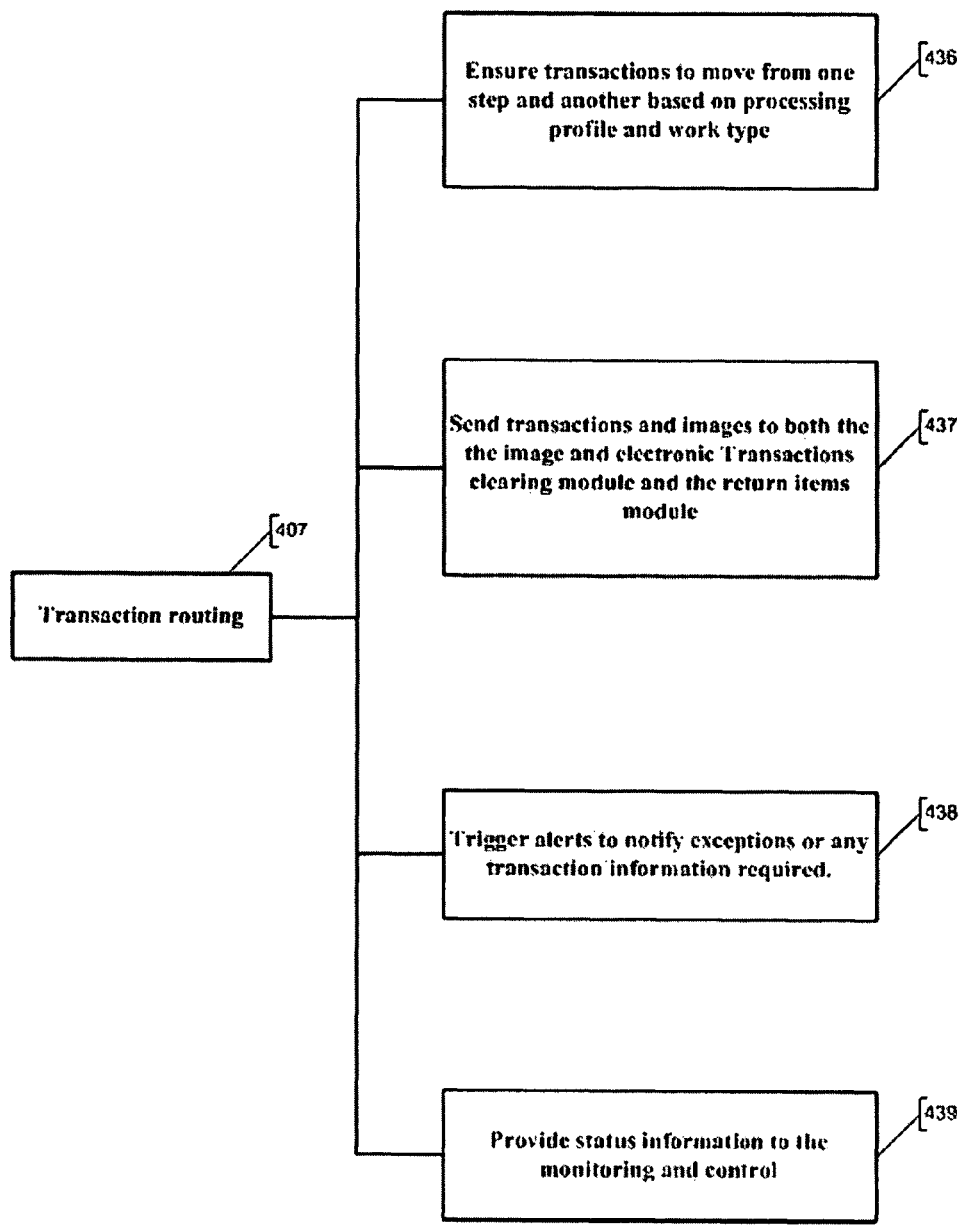

With reference to FIG. 4E, the transaction routing function 407 ensures a transaction to move from one step to another step 436. This includes: remote capture, data and image processing, transmission, customer service, and to and from the archive. This function will send transactions and images to the images and electronic transaction clearing module and the return items module 437. These two modules will receive transaction information such as return items, exception/reject/duplicate transactions, deposit transaction availability, and transaction clearing method along with their processing status. This function will also trigger alerts to notify exceptions or any transaction information required 438. In addition, the transaction routing provides status information to the monitoring and control function 439.

Figure 4F:
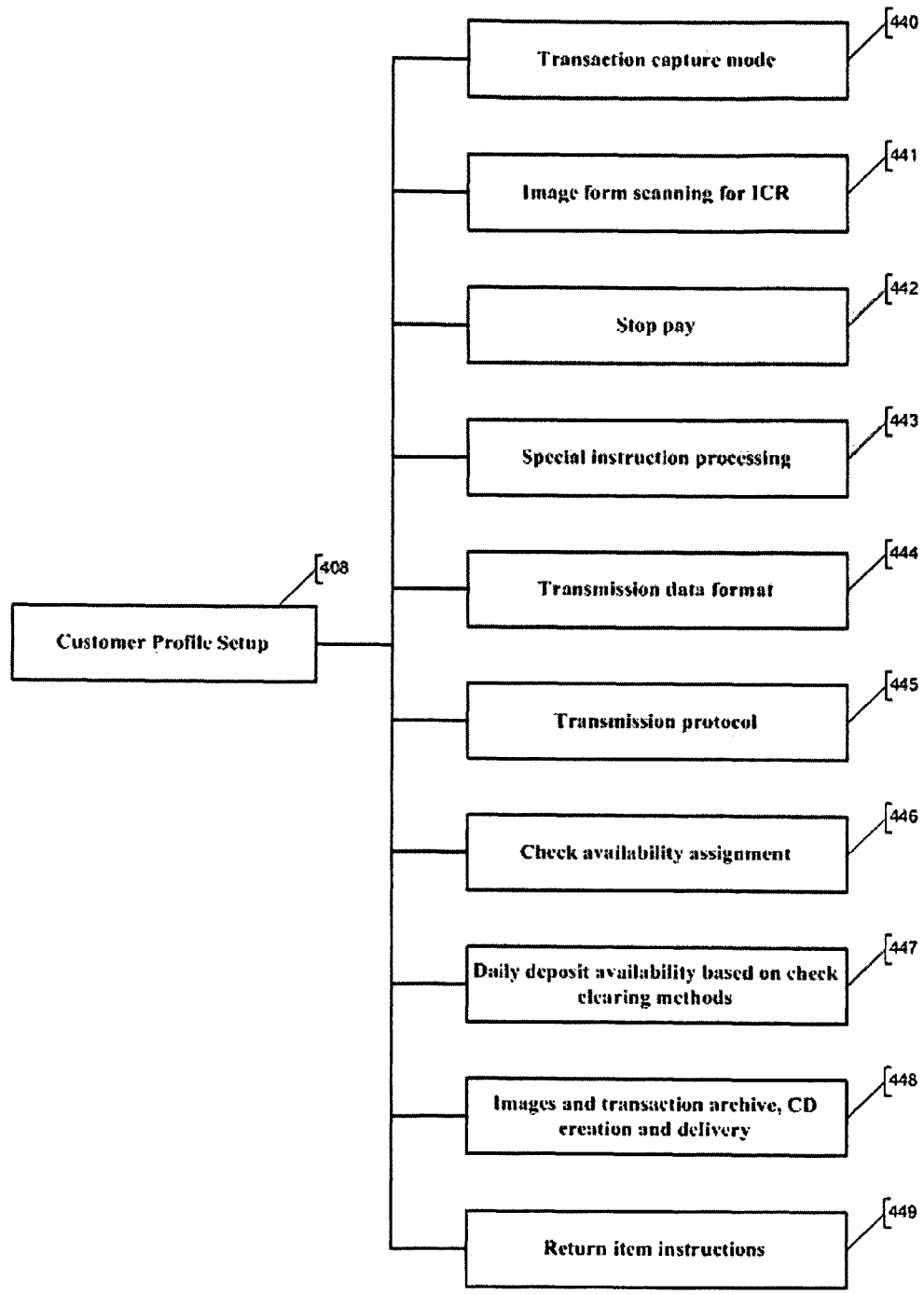

With reference to FIG. 4F, the transaction management module can customize process through its customer profile setup function 408, which includes setup of: transaction capture mode 440; image form scanning for ICR 441; stop pay 442; special instruction processing 443; transmission data format 444; transmission protocol 445; check availability assignment 446; daily deposit availability based on check clearing methods 447; image and transaction archive, CD creation and delivery 448; and return items instructions 449.

The transaction management module 103 for managing transaction including reporting to and answering inquiries from customers via internet or other communication means, and creating files, comprises: means for customer self-service; means for central control; means for monitoring and control; a transmission facility; means for financial reporting; archive; means for transaction routing; and means for customer profile setup. The transaction management module may comprise web service, enhanced viewer, computer, software, database, and storage device.

Figure 5A:
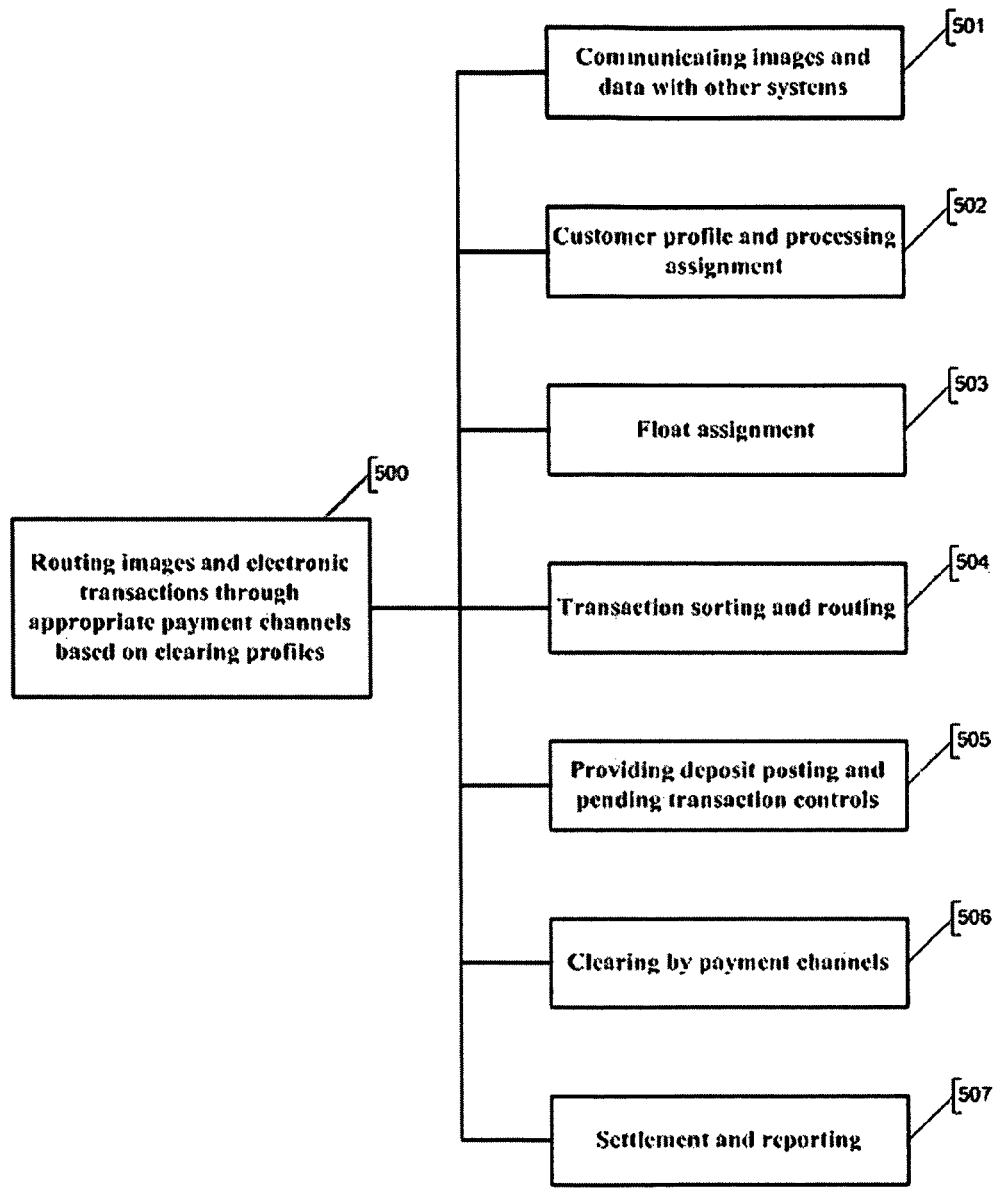
FIGS. 5A-5D are schematic block diagrams of the images and electronic transaction clearing module in accordance with an embodiment of the present disclosure.

Routing both images and electronic transactions through appropriate payment channels based on customers' and financial institutions' clearing profiles 500 provides a single payment management engine for all inbound and outbound electronic payments, and establishes an architecture that can interface with all payment and money movement applications. This method is built on an open infrastructure that provides a web service interface using standard XML messaging as well as the standard check data and image formats. With reference to FIG. 5A, this method consists of the following functions: communicating payment images and data with other systems 501, customer profile and processing assignment 502, float assignment 503, transaction sorting and routing 504, providing deposit posting and pending transaction controls 505, clearing by payment channels 506, and settlement and reporting 507.

Figure 5B:
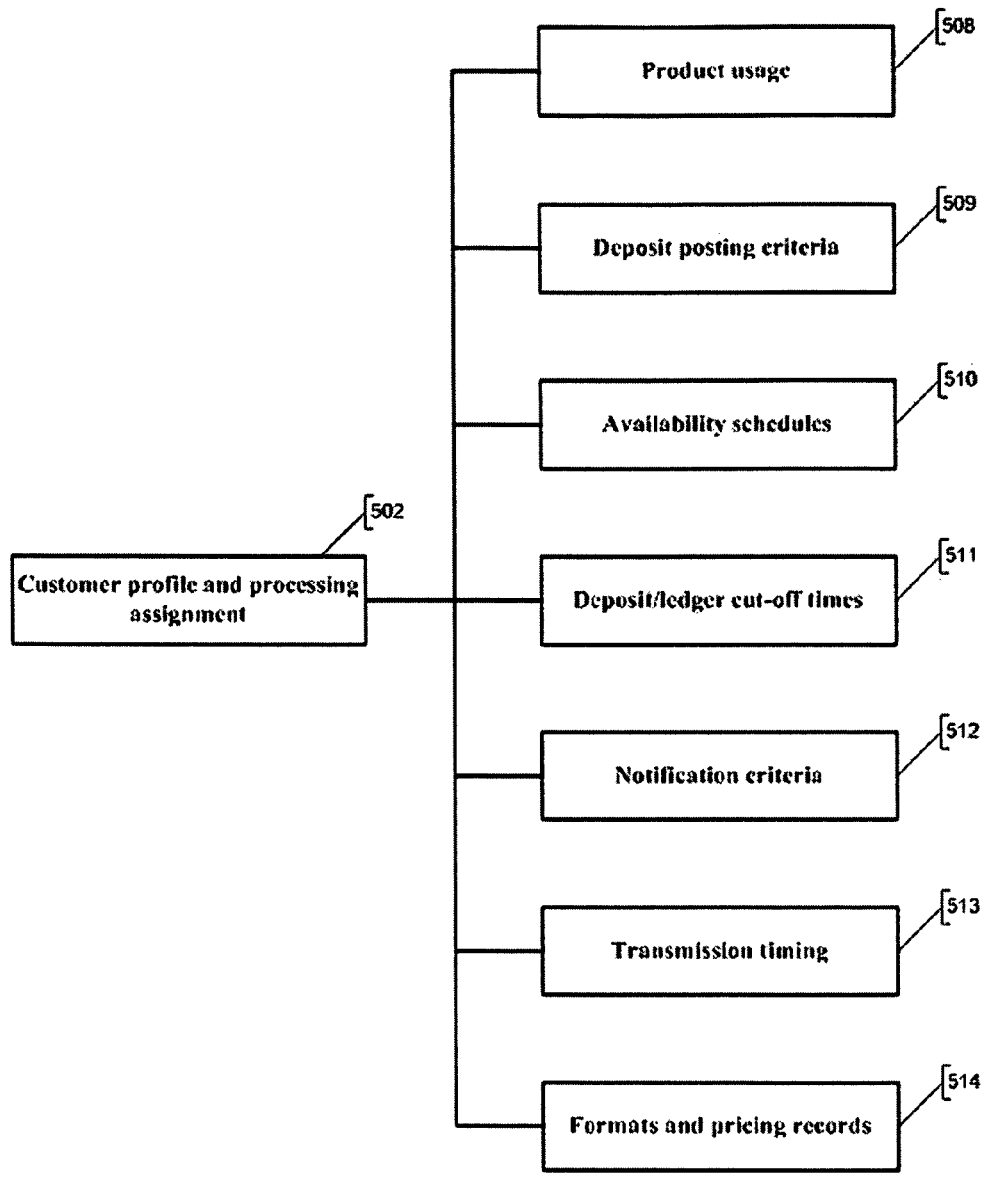

With reference to FIG. 5B, the customer profile and processing assignment 502 provides the customer setup and profile management including: product usage 508, deposit positing criteria 509, availability schedules 510, deposit/ledger cut-off times 511, notification criteria 512, transmission timing 513, and formats and pricing records 514. It also provides clearing recipient set-up and profile management.

Figure 5C:
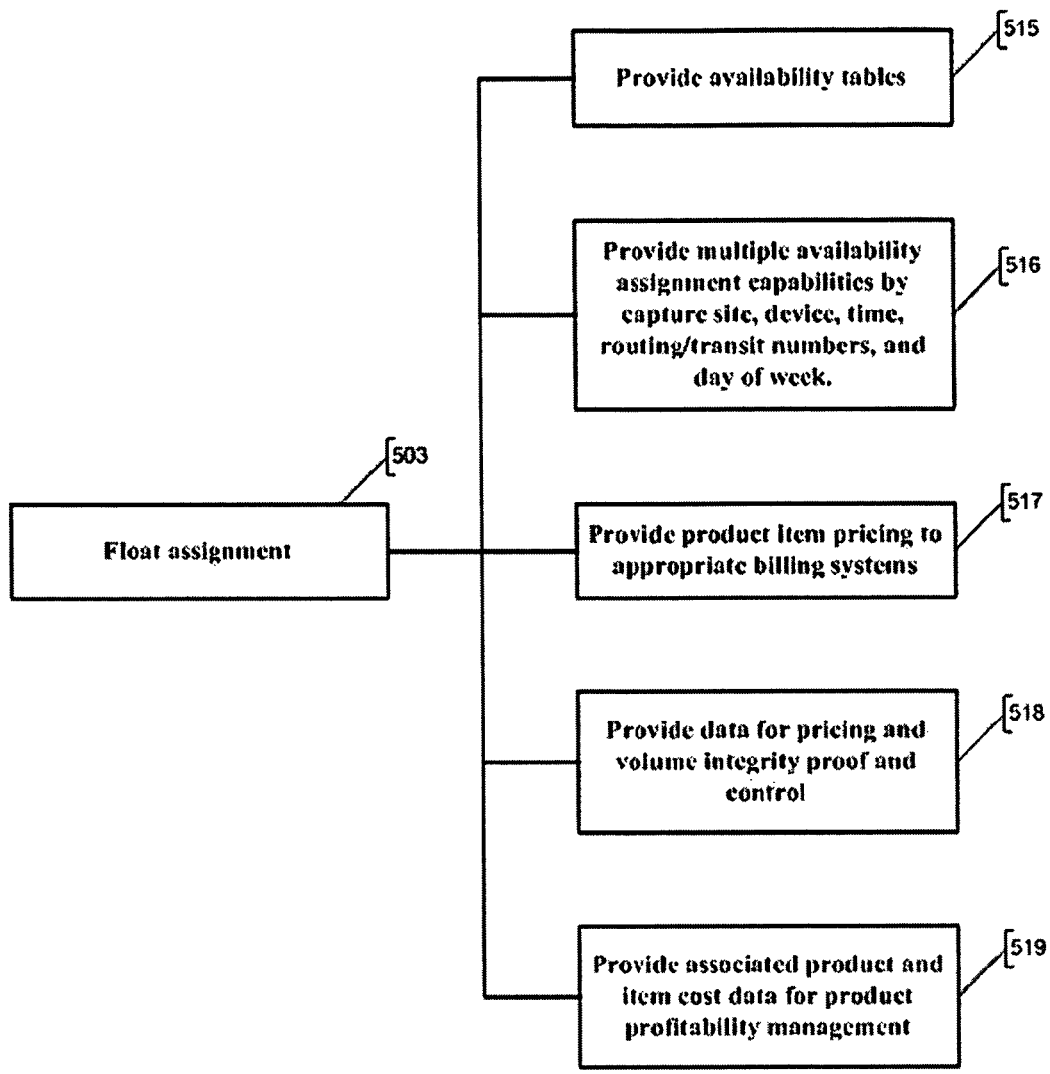

With reference to FIG. 5C, the float assignment 503 provides unique availability tables to assign deposit availability to customers 515. These tables can be accessed and updated via the central control. This function provides multiple availability assignment capabilities by capture site, device, time, routing/transit numbers, and day of week 516. This function also provides product item pricing to appropriate billing systems 517, data for pricing and volume integrity proof and control 518, and associated product and item cost data for product profitability management 519.

The transaction sorting and routing 504 provides transaction routing and posting control including transaction summary information, adjustments, return items and availability assignment. This function selects the optimum electronic payment channel for each processed item based on risk, cost, clearing rules, and schedules. This function will also perform exception processing on the same day as the transaction is processed. This exception processing includes handling account number editing, stop payment, and closed/dormant accounts. In addition, payments are matched against transaction database to prevent double posting. The payment images and data will be sent to the payment channels for clearing.

Figure 5D:
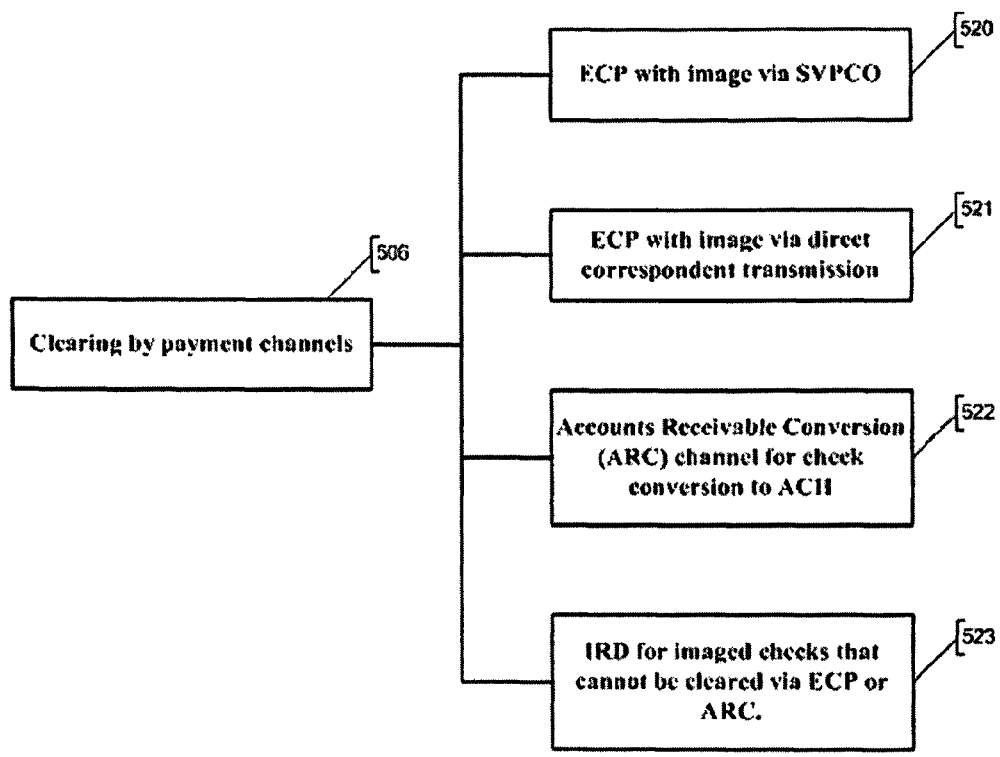

With reference to FIG. 5D, the clearing by payment channels function 506 for image-based check processing include: electronic check presentment (ECP) with image via SVPCO 520; electronic check presentment (ECP) with image via direct correspondent transmission 521; accounts receivable conversion (ARC) channel for check conversion to automated clearing house (ACH) 522; and image replacement document (IRD) for imaged checks that cannot be cleared via ECP or ARC 523.

The settlement and reporting function 507 provides deposit and balance reporting data, and customer transaction details. This function also provides reconcilement, proof and control, and adjustment functionality for all system interfaces including delivery channels, facing applications, specific business services and payments channels as well as shared operation support channels like customer service centers, and image and data archive.

The data and transaction clearing module 104 for routing both data and transactions through appropriate payment channels based on customers' and financial institutions' clearing profiles comprises: data and transaction interface; means for customer profile and processing assignment; means for float assignment; means for transaction sorting and routing; warehousing and pending database; payment channels; and means for settlement and reporting. The data and transaction clearing module may comprise web service, computer, software, database, and storage device.

Figure 6:
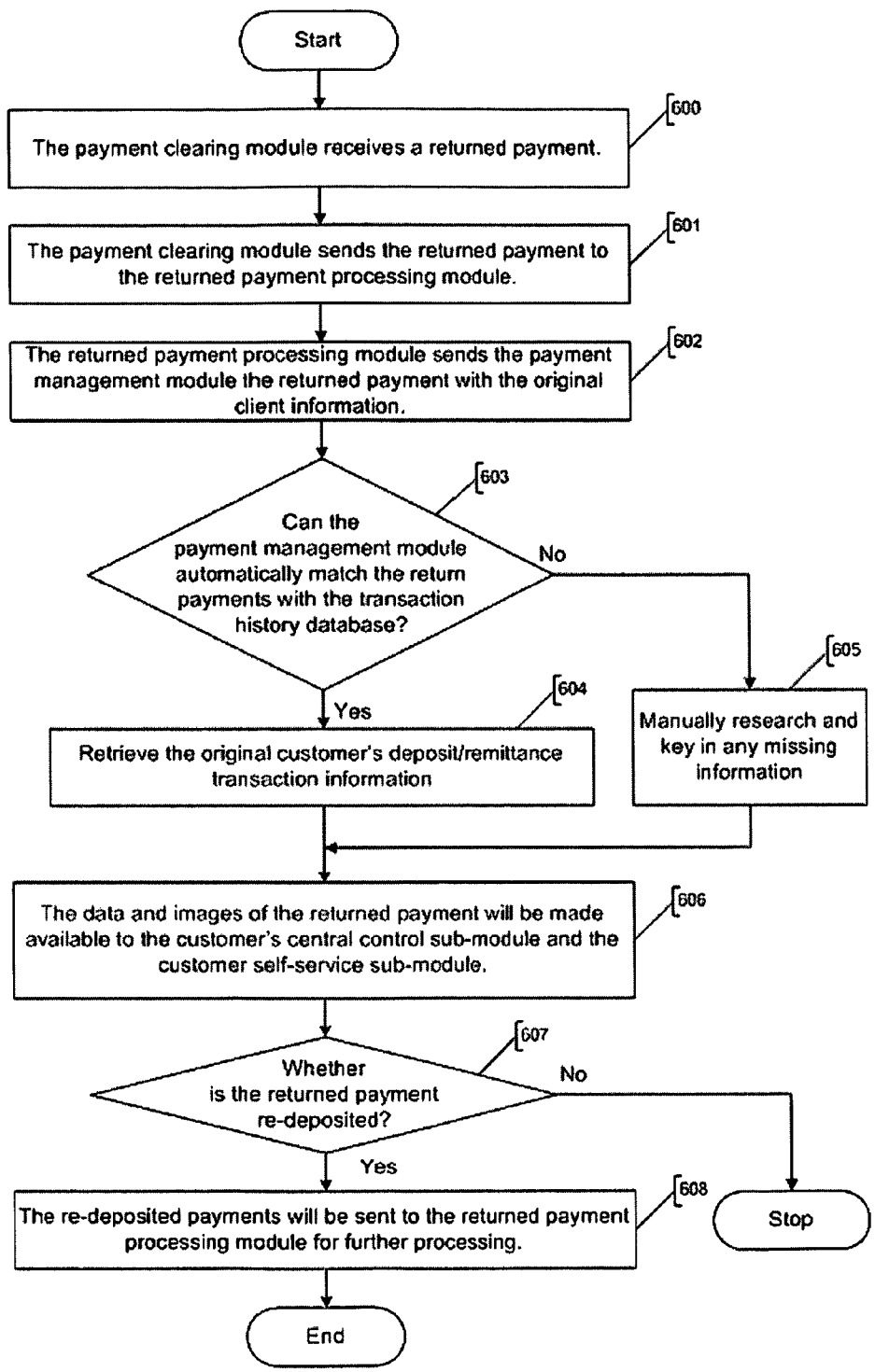
FIG. 6 is a flowchart depicting the steps carried out by the return items module in accordance with an embodiment of the present disclosure.

FIG. 6 is a flowchart showing a process of handling returned payments by a returned payment processing module in accordance with one embodiment of the present invention. When a payment clearing module receives a returned payment 600, it will send it to the returned payment processing module 601. The returned payment processing module then sends the returned payment with the original client information to the payment management module 602. The payment management module then tries to automatically match the returned payment with its transaction history database 603. If it can, it will retrieve the customer's original transaction information 604. If it cannot, an office personnel will manually research and key in any missing information 605. The returned payment's data and images will be made available to the central control sub-module and the customer's self service sub-module of the payment management module 606. Then it is decided by the customer and the financial institution whether the returned payment may be re-deposited 607. If yes, the re-deposited payment is sent to the returned payment processing module for further processing 608.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for integrating transaction processing, comprising:
   an image capture module at a payment acceptance location comprising an image capture device that captures payment data for a payment;
   a central processing module comprising at least one of a plurality of computer processors that receives the payment data and processes the captured payment data based on a payment processing instruction, the payment processing instruction including customer defined rules, processor defined rules, and regulatory defined rules;
   a risk management module comprising at least one of a plurality of computer processors that compares the captured payment data to a stop file, wherein the stop file comprises an identification of accounts that are designated not to accept deposits;
   an electronic quality control module comprising at least one of the plurality of computer processors that reviews the quality of the captured payment data for negotiability and acceptability;
   an electronic payment type determination module comprising at least one of the plurality of computer processors that determines a payment type from the captured payment data;
   a clearing module comprising at least one of the plurality of computer processors that manages a transaction based on the payment;
   a transaction management module comprising at least one of the plurality of computer processors that manages transmissions and reports regarding the transaction in real time; and
   an inquiry management module comprising at least one of the plurality of computer processors that manages inquiries regarding the transaction in real time.

2. The system of claim 1, further comprising:
   a return module that identifies a payment that should be returned.

3. The system of claim 2, wherein the stop file further comprises an identification of accounts that are sources of possible fraudulent payments.

4. The system of claim 2, wherein the return module further:
   matches the returned payment with a payment history database;
   retrieves transaction information by the transaction management function;
   provides return items' data to the central processing site control and a customer's self-service; and
   returns the return items.

5. The system of claim 1, wherein the payment acceptance location further comprises a lockbox module that receives lockbox payments.

6. The system of claim 1, further comprising:
a means for providing identification marking on certain payment types.

7. The system of claim 6, wherein the means for providing identification marking comprises a device that sprays the identification marking.

8. The system of claim 7, wherein the identification marking comprises an identification number.

9. A system for integrating transaction processing, comprising:
an image capture module at a payment acceptance location comprising an image capture device that captures payment data for a payment;
a central processing module comprising at least one of a plurality of computer processors that receives the payment data and processes the captured payment data based on a payment processing instruction, the payment processing instruction including customer defined rules, processor defined rules, and regulatory defined rules;
a risk management module comprising at least one of a plurality of computer processors that compares the captured payment data to a stop file, wherein the stop file comprises an identification of accounts that are sources of possible fraudulent payments;
an electronic quality control module comprising at least one of the plurality of computer processors that reviews the quality of the captured payment data for negotiability and acceptability;
an electronic payment type determination module comprising at least one of the plurality of computer processors that determines a payment type from the captured payment data;
a clearing module comprising at least one of the plurality of computer processors that manages a transaction based on the payment;
a transaction management module comprising at least one of the plurality of computer processors that manages transmissions and reports regarding the transaction in real time; and
an inquiry management module comprising at least one of the plurality of computer processors that manages inquiries regarding the transaction in real time.

10. The system of claim 9, further comprising:
a return module that identifies a payment that should be returned.

11. The system of claim 9, wherein the payment acceptance location further comprises a lockbox module that receives lockbox payments.

12. The system of claim 9, further comprising:
a means for providing identification marking on certain payment types.

13. The system of claim 9, wherein the means for providing identification marking comprises a device that sprays the identification marking.

14. The system of claim 9, wherein the identification marking comprises an identification number.

15. The system of claim 9, wherein the return module further:
matches the returned payment with a payment history database;
retrieves transaction information by the transaction management function;
provides return items' data to the central processing site control and a customer's self-service; and
returns the return items.

* * * * *